United States Patent [19]

Grundy, Jr.

[11] Patent Number: 5,711,673
[45] Date of Patent: *Jan. 27, 1998

[54] METHOD FOR INTERPRETING A PLURALITY OF RESPONSE MARKS ON A SCANNABLE SURFACE

[75] Inventor: John N. Grundy, Jr., Gilbert, Ariz.

[73] Assignee: National Computer Systems, Eden Prairie, Minn.

[*] Notice: The term of this patent shall not extend beyond the expiration date of Pat. No. 5,420,407.

[21] Appl. No.: 393,692

[22] Filed: Feb. 24, 1995

Related U.S. Application Data

[62] Division of Ser. No. 122,152, Sep. 17, 1993, Pat. No. 5,420,407.

[51] Int. Cl.$^6$ .................................................. G06K 7/10
[52] U.S. Cl. .................................... 434/353; 434/358
[58] Field of Search ............................... 434/353–360; 235/435, 454–456

[56] References Cited

U.S. PATENT DOCUMENTS

| | | |
|---|---|---|
| 3,148,460 | 9/1964 | Haritonoff . |
| 3,412,484 | 11/1968 | Evans et al. . |
| 3,445,942 | 5/1969 | Azure . |
| 3,599,349 | 8/1971 | Albright . |
| 3,601,906 | 8/1971 | Roche . |
| 4,153,895 | 5/1979 | Weisbrod et al. . |
| 4,217,487 | 8/1980 | Kjeer . |
| 4,300,123 | 11/1981 | McMillin et al. . |
| 5,073,700 | 12/1991 | D'Onofrio . |

FOREIGN PATENT DOCUMENTS

WO84/00832  3/1984  WIPO .

*Primary Examiner*—Richard J. Apley
*Assistant Examiner*—Glenn E. Richman
*Attorney, Agent, or Firm*—Dorsey & Whitney LLP

[57] ABSTRACT

To determine a read level threshold for discriminating those response bubbles on a scannable answer sheet intended to be marked from those response bubbles not intended to be marked, an adjustable read level threshold is dynamically determined based on the read levels of a designated pool of response bubbles. Response bubble marks having a darkness read level at or above a threshold level are interpreted to be intended response marks, and different response bubbles in which response marks may be found are assigned different predetermined scoring values.

20 Claims, 7 Drawing Sheets

METHOD FOR INTERPRETING A PLURALITY OF RESPONSE MARKS ON A SCANNABLE SURFACE

This is a Division of application Ser. No. 08/122,152 filed Sep. 17, 1993, now U.S. Pat. No. 5,420,407.

BACKGROUND OF THE INVENTION

1. Field of Invention

The present invention relates to a system for interpreting multiple marks on a scannable sheet, such as a scannable sheet used for administering objective examinations or collecting survey information. Each response "bubble" on the scannable surface is evaluated relative to selected other response bubbles on the sheet, and a determination is made as to whether the evaluated bubble is to be interpreted as chosen (i.e., intentionally marked as a response) or unchosen (i.e., intentionally not marked as a response).

2. Description of Prior Art

Figure 1:
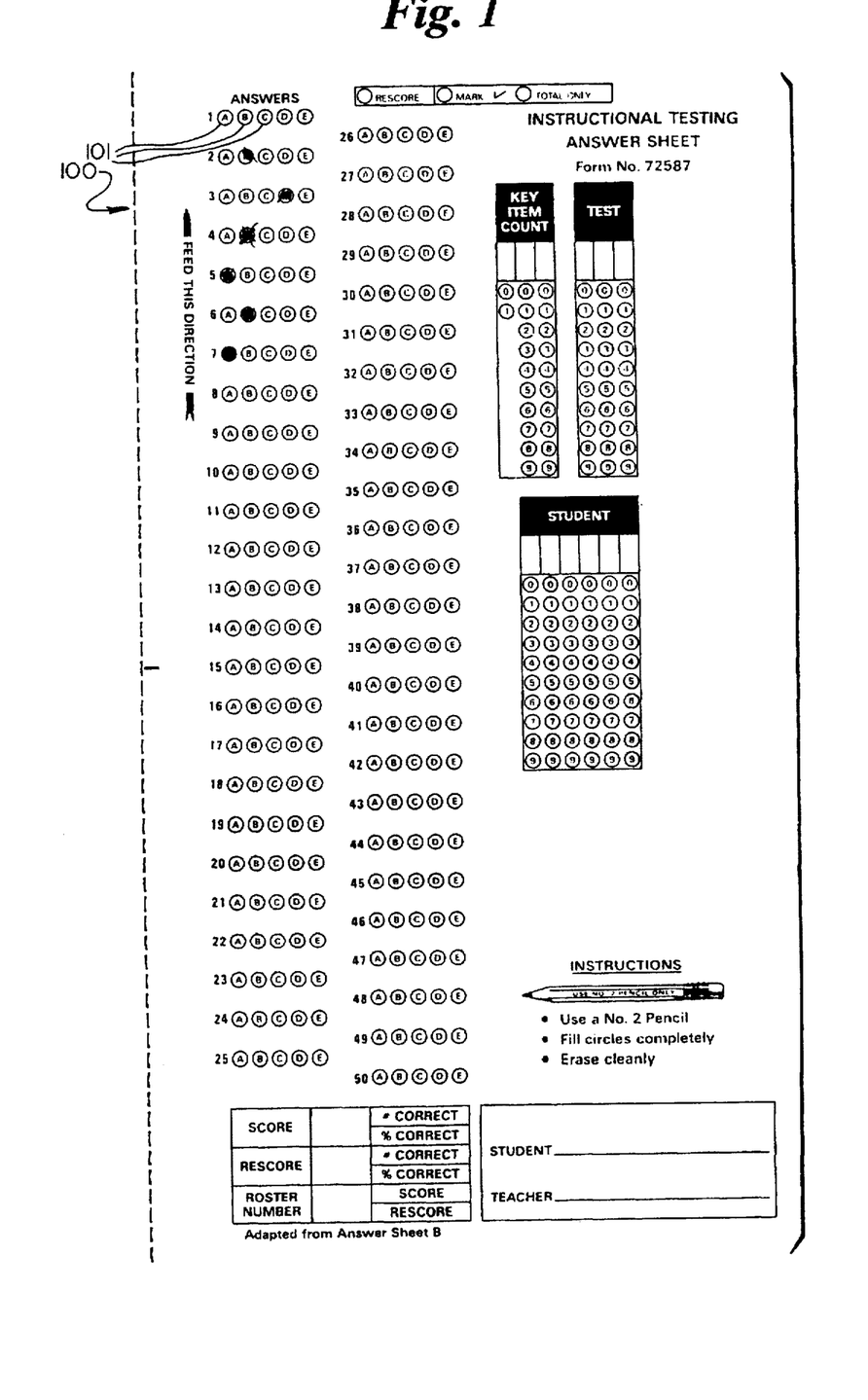
FIG. 1 is a typical scannable answer sheet with five response bubbles per answer area, showing various types of respondent markings that may appear.

Modern multiple choice examinations are administered by requiring each respondent or examinee to choose his or her answers on some variation of the well-known scannable answer form. One such scannable form 100 is shown in FIG. 1. The scannable answer form 100 includes space for a number of questions to be answered by marking response areas ("bubbles") corresponding to answer selections provided for each question. The same or a similar form can be used to collect survey information, where the respondent responds to survey inquiry questions by darkening response bubbles. Unlike the responses in typical academic examinations, the responses in surveys are not evaluated as "correct" or "incorrect," but discerning the respondent's intended responses is still equally important.

Whatever the purpose of the scannable form, there are normally at least two response bubbles in the answer area for each question, and often there are more than two. FIG. 1 shows five response bubbles 101 for each question (labeled "A" to "E"). In the context of a typical academic examination, the respondent or examinee indicates on the scannable form his or her answer to each question by darkening response bubbles. The test is graded by a procedure that involves scanning the form to obtain a read level for each response bubble, which indicates how dark the examinee's mark is for that particular response bubble. Read levels are usually scaled in the range of 0 to 15, where a higher read level indicates a darker mark, and a lower read level indicates a lighter mark (level 0 being the lightest, 15 the darkest). If an examinee does not mark a particular response bubble, the corresponding read level would be at or near 0. By contrast, bubbles darkened by a mark will have read levels that fall near the high end of the read level scale. Erased marks usually fall between these two extremes.

Multiple choice academic examinations usually involve questions where there is exactly one correct answer per question. The common way to grade such an examination is to scan the response bubbles and identify the unique, darkest response bubble in the answer area for each question. That is, the darkest mark in a response bubble that is a sufficient discrimination level away from the next darkest mark is deemed to indicate the examinee's answer to the question. If such a mark is not found, the entire question is scored as not answered. The lighter marks corresponding to the same question are typically ignored.

This procedure works well for examinations where there exists only one correct answer per question, because it can reasonably be assumed that the unique, darkest mark is the examinee's intended answer. But when there is more than one correct answer per examination question or, in the context of survey questions, when the respondent wishes to choose either none or more than one of the possible responses, this procedure does not produce good results (or may require multiple scans for the same sheet). Because only the darkest of the response bubbles is identified, other response bubbles chosen by the examinee are not identified. Thus, intended responses may be missed. Similarly, a response bubble with an erasure may be misinterpreted, if an examinee intends to leave all response bubbles unchosen.

The inadequacies with this prior art procedure can be illustrated by way of example. FIG. 1 shows an answer sheet 100 with five response bubbles 101 for each question, usable for an academic examination where the examinee is given five possible answer choices for each question, and where there can be any number of answers (from 0 to 5) that are considered correct (or at least sufficiently "correct"). For each question, credit is given for each correct answer within each question. Assume answer choices "A," "C," and "D" are correct answers and answers "B" and "E" are incorrect answers to a particular question. Under one scoring scheme, an examinee who chose all three of the correct answers would be given credit for three correct answers, but an examinee choosing only one of the correct answers would receive credit for only one correct answer. Because the prior art procedure described above can only handle a single darkest mark and assumes all other response bubbles are unchosen (even if a lighter mark does appear), such a scoring scheme could not be implemented; the prior art provides no means for differentiating between an examinee who chose all three correct answers and an examinee who chose only one correct answer. Therefore, this prior-art scanning and recognition procedure does not produce the desired results.

One possible solution for this problem is to define a single fixed read level cut-off, whereby all response bubbles with read levels at or above the fixed read level cut-off are assumed to be intended responses (i.e., chosen by the examinee), and whereby all response bubbles with read levels below the fixed read-level cut-off are assumed not to be intended responses (i.e., left unchosen by the examinee). The single fixed read level is thus used to decide whether each response bubble is either intentionally chosen or intentionally unchosen. With this solution, however, it has been observed that inaccurate results are obtained because of the variation in response bubble read levels for intended responses. Read level variation can be caused by pencil wear, pencil lead type variations, or adjacent erasures, or by fatigue, carelessness; or haste on the part of the respondent. (See FIG. 1, in which answer areas for questions 1 through 6 show examples of response bubbles with differing degrees of darkness. Response bubble "A" for question 7 is fully darkened).

What is needed, therefore, is a method for accurately evaluating scannable forms for examinations and surveys that permits more accurate discrimination of response bubble markings when, for any given question, one or more than one response bubble or no response bubble may be chosen.

SUMMARY OF THE INVENTION

Figure 7:
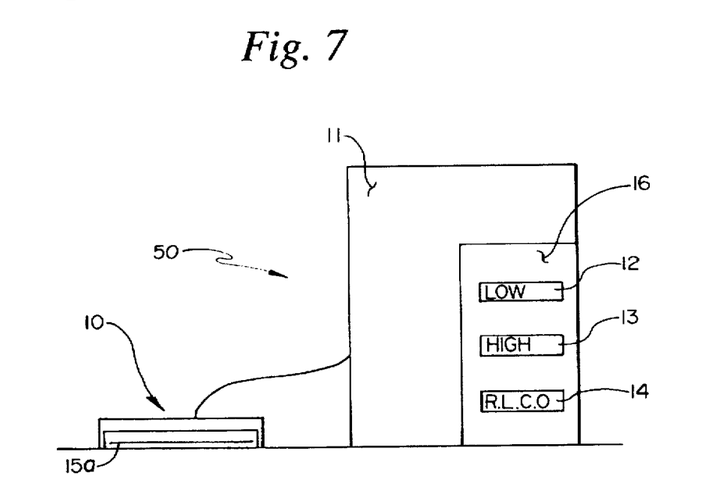
FIG. 7 is a schematic block diagram illustrating one apparatus embodiment of the present invention.

The present invention relates to a method and system for interpreting a scannable surface with one or more answer areas, wherein each of the answer areas comprises a plurality of response bubbles. FIG. 7 is a schematic diagram of one embodiment of the present invention. The system comprises a scanner 10 for reading the scannable surface and obtaining a read level value on a predefined mark darkness scale for each of the response bubbles on a scannable sheet 15a and a general purpose computer 11 capable of executing instruction modules 16. The modules 16 include a first instruction module 12 for preparing a read level profile consisting of a tabulation of the number of response bubbles (if any) found to have each of the read level values in the darkness scale. The modules 16 also include a threshold selection means, including: a second instruction module 13 for determining a starting point read level for a search in the read level profile to find a read level gap of predetermined length (i.e., to identify one or more read level values in the darkness scale for which no response bubbles were found), and a third instruction module 14, with means for identifying the read level gaps, a threshold setting means for determining an adjustable read level cut-off based on the identification of read level gap(s) of predetermined length, and means for identifying each response bubble mark having a darkness read level at or above the adjustable read level threshold as an intended response mark.

In one embodiment, the third instruction module 14 carries out a procedure comprising the steps of determining whether there exists a read-level gap consisting of at least two consecutive read levels. The search for this read level gap begins at a starting point read level determined by averaging the read level values found for the response bubbles within a designated pool of response bubbles, after excluding the read level values that are at or below a noise level. If the search finds one read-level gap consisting of two consecutive read levels, the adjustable read level cut-off is set at the read level just above the highest read level included in the read-level gap consisting of two consecutive read levels. If no appropriate read-level gap exists, the adjustable read level cut-off is set at a default read level.

A primary object of the present invention is accurate interpretation of multiple marks within response bubbles on a scannable surface by using chosen/unchosen discrimination criteria that vary according to the observed read levels for a designated pool of adjacent response bubbles.

A further object of the invention is to provide multiple answer detection in combination with scoring schemes that use multiple answer data from a single question to provide differential weighting for different answers and to provide both positive and negative credit in calculating a resultant score from multiple answers to a single question.

BRIEF DESCRIPTION OF THE DRAWINGS

FIG. 2 is a typical scannable answer sheet with twenty response bubbles per answer area.

DETAILED DESCRIPTION

The present invention is a method and system for scanning and interpreting marks placed within multiple response bubbles on a scannable form. The invention involves dynamically adjusting the read level threshold for a group of response bubbles to distinguish chosen from unchosen response bubbles, based on an evaluation of read level values observed for a designated pool of response bubbles. The preferred embodiment of the present invention is hereinafter described primarily in the context of an academic examination grading process, but it can be applied in all situations where information is obtained through the use of a scannable surface. For example, the present invention may also be used in market surveys, psychological tests, employment surveys or tests, or in other circumstances where information is collected through the use of objective questions.

The preferred embodiment of the present invention will be described by reference to FIGS. 2, 3, 4, 6 and 7. FIG. 2 shows a scannable form (or surface) 15 with twenty response bubbles 30 (labeled "A" through "T") for each of fifty questions. FIG. 7 shows a system 50 for scanning and interpreting a scannable form 15a after it is marked by a respondent or examinee who refers to examination material that corresponds thereto. The scoring administrator causes the marked form 15a to be scanned by scanner means 10 in system 50, with computer 11 executing software 16 used to develop scoring information. Among the first steps in this process is the assignment of one of the available read level values to each response bubble of interest for scoring. The response bubbles of interest form a "designated pool" of bubbles used to determine an adjustable read level threshold in accordance with the present invention. For purposes of explanation, the twenty response bubbles "A" through "T" in the answer area for each question will be taken as the designated pool. FIG. 2 shows the designated pool 32 for question 1. As will be explained later, other designated pools may be selected, consisting of response bubbles for two or more questions.

Figure 3:
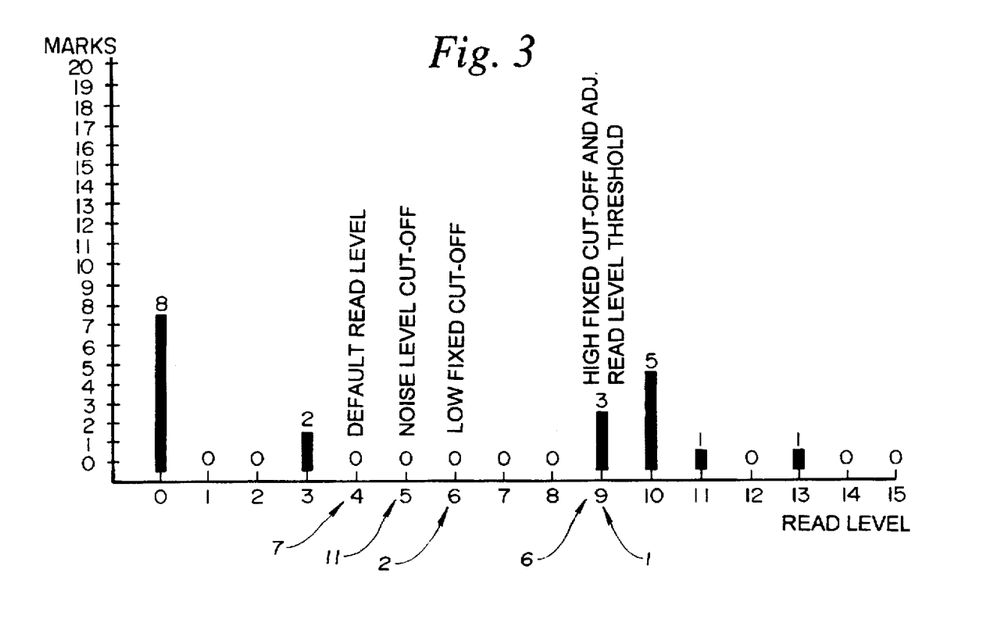
FIGS. 3, 4, and 5 are read level distribution graphs, each of which shows the distribution of observed read level values for one question answered on an answer sheet with twenty response bubbles per answer area.

FIG. 3 shows a read level distribution graph for a hypothetical examinee's response to one question on a scannable form as in FIG. 2. The read level distribution graph contains the initial information assembled and evaluated by a system 50 employing the present invention. The various read level values determined for each response bubble scanned are shown in the graph. In the present example, the available read level values are defined by a response mark darkness scale with sixteen possible levels, stored as single digit ASCII representation of hexadecimal values 0 through F. A table recording the read level values (in digital form) determined for each response bubble for a particular question that would lead to a graph as in FIG. 3 might appear as follows:

| Response No. | Read Level | Response No. | Read Level |
|---|---|---|---|
| A | 0 | K | 3 |
| B | 0 | L | 9 |
| C | 0 | M | 10 |
| D | 0 | N | 10 |
| E | 3 | O | 10 |
| F | 9 | P | 11 |
| G | 0 | Q | 13 |
| H | 0 | R | 10 |
| I | 10 | S | 0 |
| J | 9 | T | 0 |

In FIG. 3, the horizontal axis represents the 16 possible read level values from lightest (0 is the lightest possible read level) to darkest (15 is the darkest possible read level). The vertical axis represents the number of response bubbles for the particular question in a designated pool that were determined to have a particular read level value. That is, the graph presents a read level profile (or distribution), showing how many response bubbles exhibiting a particular level on the mark darkness scale were found for each level in the scale. For example, for the question shown in FIG. 3, the examinee apparently left eight of the twenty response bubbles blank (read level 0). Two response bubbles marks had a read level of 3; three had a read level of 9; five response bubbles marks had a read level of 10; and read levels 11 and 13 each were represented by one response bubble mark. For read levels 1–2, 4–8, 12 and 14–15, no response bubble mark with the corresponding level was found. For each question to be scored, the data as in the above chart and in a read level distribution graph as in FIG. 3 are assembled.

The task of any scannable mark interpretation system is to determine the intention of the respondent with respect to each response bubble at the time of the test or survey. Only the marks and any erasures present on the surface of the form are available to discern intention. Dark marks are more likely to represent respondent-chosen bubbles than lighter marks; the key question is: what level (or levels) on the mark darkness scale should be used to discriminate chosen from not chosen? With reference to the example depicted in FIG. 3, the function of the software 16 in defining an appropriate read level for this discrimination can be explained.

Underlying the present invention are two observations about respondents' behavior in marking, i.e., darkening, response bubbles. First, the read levels corresponding to response bubbles that the respondent intends to represent chosen response bubbles will differ meaningfully in darkness from those read levels that represent unchosen response bubbles. Therefore, if there is a gap in the observed read levels for a question along the mark darkness scale, this read level gap probably signals a respondent's attempt to distinguish intended from non-intended response marks. FIG. 3 shows gaps at the following darkness levels: 1–2; 4–8 and 12. The second observation is that the read level distinguishing intended from non-intended response marks will vary between respondents and also even between questions for a given respondent. This suggests the need for an adjustable read level threshold.

Finding the gap that is considered meaningful to distinguish intended from non-intended response marks must be grounded in some starting point and reasonable limits. In the present invention, it was found useful to define a low fixed cut-off, a high fixed cut-off and a noise level cut-off on the read level scale. Those response bubbles that have read levels at or above a certain predetermined level are presumably intentionally marked (i.e., "chosen") by the examinee. This preset level is referred to as the high fixed cut-off (also called the "always-a-mark" level). Any response bubble with a read level at or above the high fixed cut-off is most likely a chosen response bubble. Similarly, all response bubbles at or below a certain read level are presumably not chosen. This preset level is referred to as the low fixed cut-off. These two fixed levels may vary for different applications, but generally they are predetermined and remain unchanged for a given set of forms. To show how these preset fixed levels might be selected, FIG. 3 has a low fixed cut-off 2 identified at read level 6 and a high fixed cut-off 1 identified at level 9.

The noise level cut-off is a level defined to exclude good erasures, smudges, dirt or other dark features found on a scannable sheet that are also clearly not intended to be response marks. The noise level may be the same as or distinct from the low fixed cut-off. By way of example, FIG. 3 shows a noise level cut-off 11 at read level 5. With these parameters defined, the search for a read level gap and an appropriate read level threshold can proceed.

One preferred way of defining the starting point for the search for a read level gap is to ignore all observed read levels at or below the noise level cut-off and compute an average of the remaining observed read levels. Thus, response bubbles with a darkness below the noise level on the read level scale are ignored in computing the average. (The result may need rounding to an integer.) This average of observed, non-noise, read level values then becomes a starting point read level for a search for a read level gap. The software 16 performs comparisons on data in the read level profile, starting at the average read level and continuing to lower read levels (representing lesser degrees of darkness) to see if there was found at least one response bubble with each read level. If no response bubble has the read level value for a particular read level, that "vacant" read level is a gap by itself or part of a gap formed with adjacent, consecutive read levels that are also vacant. Using this method on the data of FIG. 3, with read level 5 taken as the noise level cut-off, the average read level is 10.1. The search begins at read level 10; therefore, the gap at read level 12 is not found in this search. The gap at read levels 5–8 is observed first. If the search were to continue, the gap at read level 4 and levels 1–2 would also be observed. However, in the preferred embodiment, the search stops at the noise level.

Once a read level gap is found by a downward search (i.e., a search from darker to less dark read level values) from the starting point read level, the gap must meet further criteria before it is accepted as significant.

The length of the read level gap is of primary significance. It has been observed by statistical study that for a mark darkness scale of sixteen read levels, the first gap consisting of two consecutive read levels found below the starting point read level will serve as an effective dividing line between the read levels corresponding to the chosen response bubbles and the read levels corresponding to the unchosen response bubbles. Thus, in the preferred embodiment, the first read level gap of length two (formed by two consecutive vacant read levels in the read level profile) found in a downward search from the starting point read level is used to discriminate between the read levels for the respondent's intended marks and the read levels for the respondent's unintended marks. A gap consisting of two consecutive read levels is the "primary gap length" in the preferred embodiment. If a gap of the primary gap length is found, then in the preferred embodiment the adjustable read level threshold is set at the read level just above the highest read level that forms part of the primary gap length.

In the event that a search downward from the starting point read level finds no read level gap of the primary gap length (before reaching the noise level), the search turns to find the highest read level gap that is one read level shorter than the primary gap length. In the preferred embodiment, this means that the search moves downward from the starting point read level to identify the highest read level gap consisting of a single read level value not represented by any response bubble in the designated pool. This becomes a "secondary gap length". If a gap of the secondary gap length is found, then the adjustable read level threshold is set at the read level just above the highest read level that forms the secondary gap length.

In the example shown in FIG. 3, levels 7–8 form a primary gap and the adjustable read level threshold 6 would be set at read level 9 (which also happens to be the high fixed cut-off). As a result, for scoring purposes all response bubbles within the answer area for the question corresponding to FIG. 3 that have read levels at or above level 9 would be considered a "chosen" response bubble (i.e., intended by the respondent to be interpreted as marked). All response bubbles that have read levels below level 9 would be considered unchosen.

Figure 4:
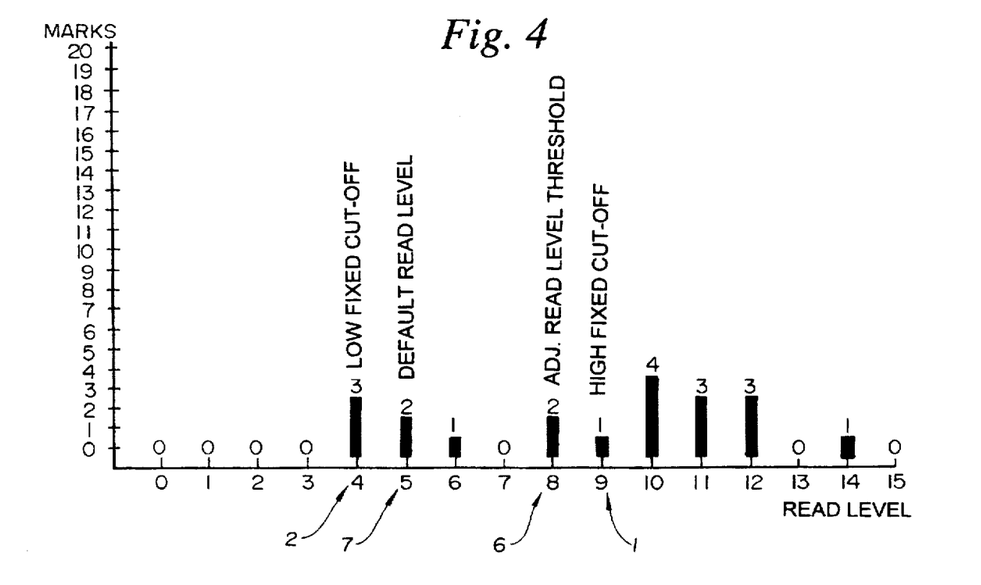

FIG. 4 shows a read level distribution graph with high fixed cut-off 1 (at read level 9) and low fixed cut-off 2 (at read level 4). There is no two-level gap between levels 4 and 9 in FIG. 4, but there is a single-level gap. Following the above-described analysis, the adjustable read level threshold 6 in this scenario would be set to read level 8 (just above the one-level gap) for scoring purposes.

To ensure that the method for identifying an adjustable read level cut-off does not lead to an adjustable read level cut-off that makes no sense, the adjustable read level found by a read level gap search can be considered tentative, subject to checking against the high fixed cut-off and the low fixed cut-off. If the tentative adjustable read level threshold exceeds the high fixed cut-off, the final adjustable read level threshold is set to the high fixed cut-off. Similarly, if the tentative adjustable read level threshold is lower than the low fixed cut-off, the final adjustable read level threshold is set to the low fixed cut-off plus one.

It will be rare for a set of responses to a particular question and the resulting read level profile to have neither a two-level gap nor a single-level gap. But if this should occur, the adjustable read level threshold is set at a default read level. This default read level serves as the level at which the adjustable read level cut-off will be set if there are no gaps at all in the read level distribution graph between the starting point read level and the noise level. As shown in FIGS. 3 and 4, a default read level 7 may be set to a level at or just above or below the low fixed cut-off (a typical default read level would be level 5).

Setting the default read level to a value below the low fixed cut-off would, in a sense, place on the respondent the burden of making sure all erased marks are completely erased, while relaxing the requirement that all chosen response bubbles are completely darkened. Alternatively, the default read level could be set at (or just below) the high fixed cut-off. This setting would relax the requirement that erased marks be completely erased, but it would require the respondent to sufficiently darken each response bubble that he or she intends to choose. A compromise between these two extremes can be reached by selecting a default read level in the range between the low fixed cut-off and the high fixed cut-off. In the preferred embodiment, the default read level is linked to the low fixed cut-off and made equal to the low fixed cut-off plus one.

The method for determining the adjustable read level threshold is carried out by the system 50 in a defined sequence of steps. The system comprises a scanner means 10 for reading the scannable surface and obtaining a read level value on a predefined mark darkness scale for each of the response bubbles on a scannable sheet 15a and a general purpose computer 11 capable of executing instruction modules 16. The modules 16 include a first instruction module 12 for setting parameters and preparing a read level profile consisting of a tabulation of the number of response bubbles (if any) found to have each of the read level values in the darkness scale. The modules 16 also include a threshold selection means, including: a second instruction module 13 for determining a starting point read level for a search in the read level profile to find a read level gap of predetermined length (i.e., to identify one or more read level values in the darkness scale for which no response bubbles were found), and a third instruction module 14, with means for identifying the read level gaps, a threshold setting means for determining an adjustable read level threshold based on the identification of read level gap(s) of predetermined length, and means for identifying each response bubble mark having a darkness read level at or above the adjustable read level threshold as an intended response mark.

Figure 6:
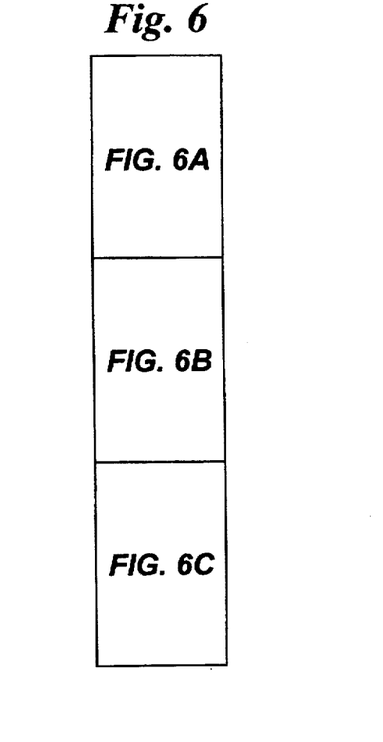
FIG. 6 is pseudo-code illustrating one embodiment of the method employed by the present invention.
Figure 6A:
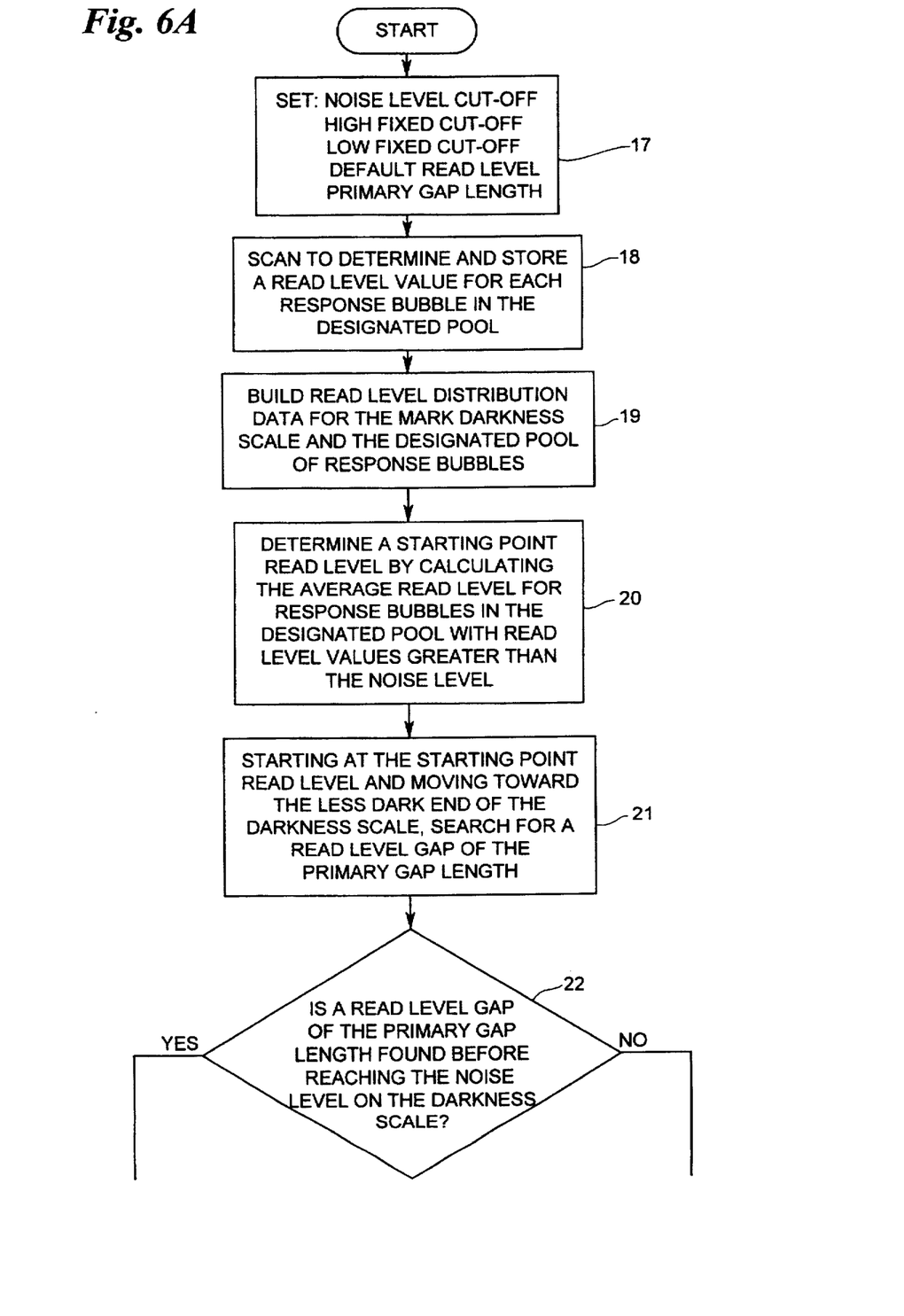
Figure 6B:
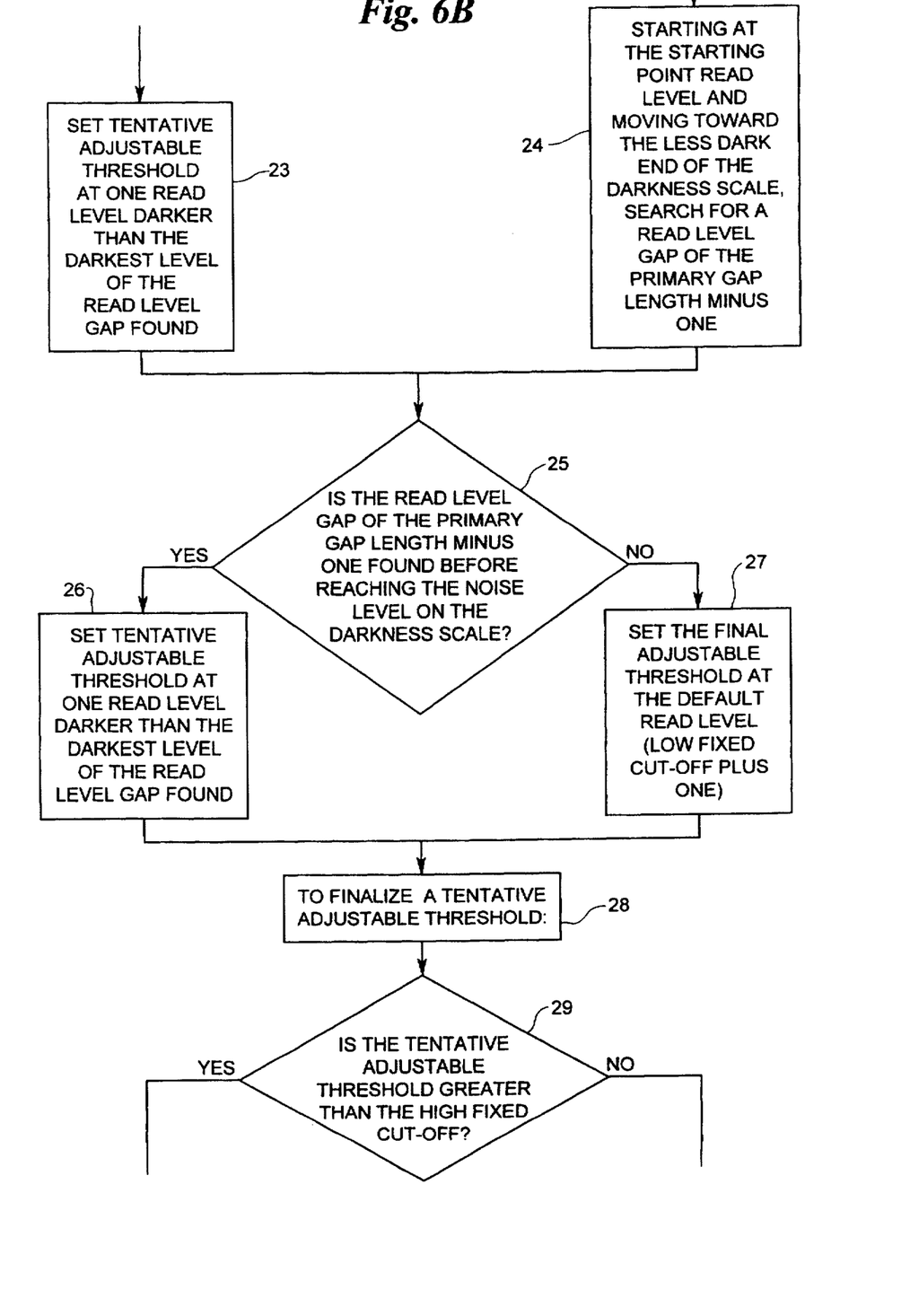
Figure 6C:
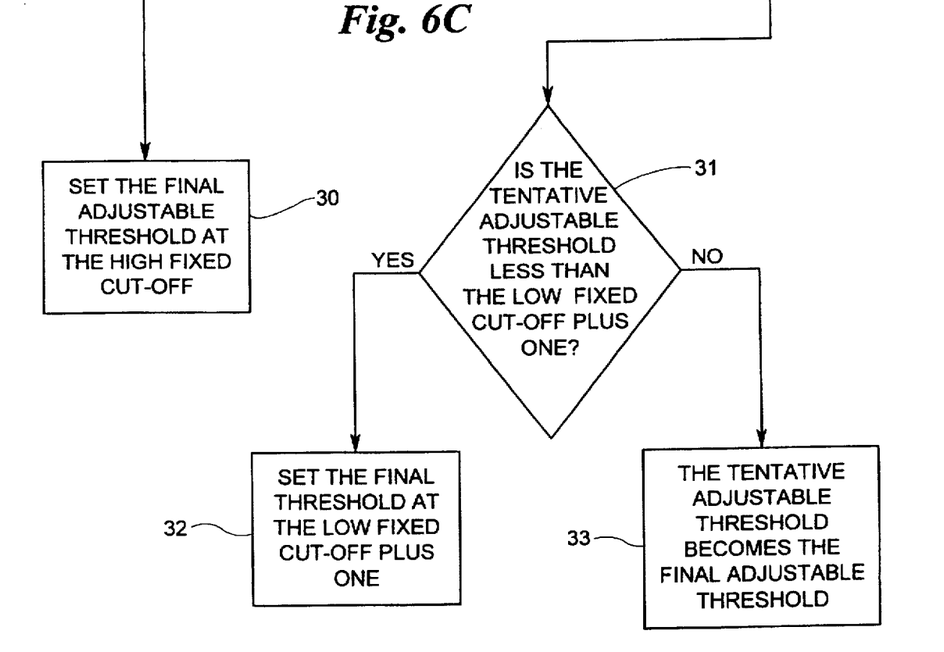

FIG. 6 illustrates a defined sequence of steps executed by the software 16 in pseudo-code. The method begins with the setting of certain parameters in step 17: a noise level cut-off (to exclude lighter marks or artifacts from the starting point level average calculation); a high fixed cut-off (indicates always-a-mark); a low fixed cut-off; a default read level and a primary gap length. (While each of these has a preset or "default" value, in the preferred embodiment the system 50 also lets the user select a value for the noise level cut-off, high fixed cut-off and low fixed cut-off.) Next, in step 18, the system 50 executes a scan to determine and store a read level value for each response bubble in the designated pool of response bubbles. In step 19, the system 50 builds read level distribution data for the mark darkness scale and the designated pool of response bubbles. In step 20, the system 50 determines a starting point read level by calculating the average read level for response bubbles in the designated pool with read level values greater than the noise level. In step 21, starting at the starting point read level and moving toward the less dark end of the darkness scale, the system 50 searches for a read level gap of the primary gap length. In step 22, there is a branching test: Is a read level gap of the primary gap length found before reaching the noise level on the darkness scale? If yes, then in step 23, the system 50 sets a tentative adjustable threshold at one read level darker than the darkest level of the read level gap found. If no, then at step 24, starting (again) at the starting point read level and moving toward the less dark end of the darkness scale, the system 50 searches for a read level gap of the primary gap length minus one. In step 25, there is another branching test: Is a read level gap of the primary gap length minus one found before reaching the noise level on the darkness scale? If yes, then in step 26 the system 50 sets a tentative adjustable threshold at one read level darker than the darkest level of the read level gap found. If no, then in step 27 the system 50 sets the final threshold at the default read level (preferably at the low fixed cut-off plus one).

In step 28, the system 50 seeks to finalize a tentative adjustable threshold. First in step 29, there is another branching test: Is the tentative adjustable threshold greater than the high fixed cut-off? If yes, then in step 30, the system sets the final adjustable threshold at the high fixed cut-off. If no, step 31 has another branching test: Is the tentative adjustable threshold less than the low fixed cut-off plus one? If yes, then in step 32, the system 50 sets the final adjustable threshold at the low fixed cut-off plus one. Otherwise, if the tentative adjustable threshold is not greater than the high fixed cut-off and also not less than the low fixed cut-off plus one, then in step 33, the tentative adjustable threshold becomes the final adjustable threshold.

The same procedure for determining the adjustable read level cut-off is carried out for each question in the preferred embodiment. The information shown in the read level distribution graph is assembled for each question and analyzed using the procedure described above. As discussed, the designated pool of response bubbles consists of the response bubbles for a single question in the preferred embodiment. This means that all the response bubbles for a particular question (but only those response bubbles) are considered in the analysis when determining the adjustable read level cut-off for that particular question or group of response bubbles. The designated pool of response bubbles is defined as all the response bubbles that are analyzed when determining the read level cut-off for a particular response bubble.

Alternate Embodiments

A procedure that analyzes the response bubbles for one question in determining the adjustable read level threshold for the response bubbles for that particular question may not fully take into account other tendencies the examinee exhibits within the scannable sheet. A variation on the preferred embodiment therefore could involve carrying out the procedure for determining the adjustable read level threshold on groups of questions, as opposed to just single questions. The response bubbles and their read levels for the one or two questions before and after the question to be scored could be included in the designated pool of response bubbles. The adjustable read level threshold would then be determined by considering the read level profile of this larger group of response bubbles (a subset of all response bubbles on a scannable form). By including the response bubbles for nearby questions, the examinee's marking tendencies on other questions are considered, but only the tendencies relating to nearby questions. The nearby questions are presumably the most indicative of the examinee's conduct with regard to marking response bubbles of the question at issue, because nearby questions are usually responded to by the examinee at about the same time. In this implementation, the designated pool of response bubbles would consist of all the response bubbles for a defined group of questions, as opposed to all the response bubbles for a single question, as in the preferred embodiment.

Another variation is to include in the designated pool of response bubbles all the response bubbles for all the questions in the examination. In other words, all response bubbles would be evaluated to determine an adjustable read level threshold that would be used for the entire examination. The adjustable read level threshold in this situation would no longer be question-dependent, but it would be examinee-dependent (assuming each examinee took the examination only once).

In other embodiments of the present invention, a longer primary gap length may be appropriate. For example, with scanners that can distinguish more read levels (e.g., response bubbles categorized with a read level profile of 32 or 64 read levels instead of the 16 used in the previous examples), a two-level gap may not produce the best results. In such a situation, a search for a three-, four-, or higher level gap may be employed in place of the search for the normal two-level primary gap length.

To illustrate the operation of the present invention with primary gap lengths that are different than two, consider the case where the primary gap length is four. The read levels between the starting point read level and the noise level are searched for a four-level gap. If a four-level gap is not found, the system 50 looks for a three-level gap. If no three-level gap is found, the system 50 searches for a two level gap. And if a two-level gap is also non-existent, the system searches for a single-level gap. If there is no gap at all between the low fixed cut-off and the high fixed cut-off, the default read level (preferable, the low fixed cut-off plus one) is used as the adjustable read level threshold.

The system 50 might also be employed with a scanner that only determines eight read levels, i.e, levels 0-7. Here a single level gap might be used as the primary gap length. However, work on the present invention has shown that good discrimination results are more difficult to achieve with less than sixteen read levels.

Figure 5:
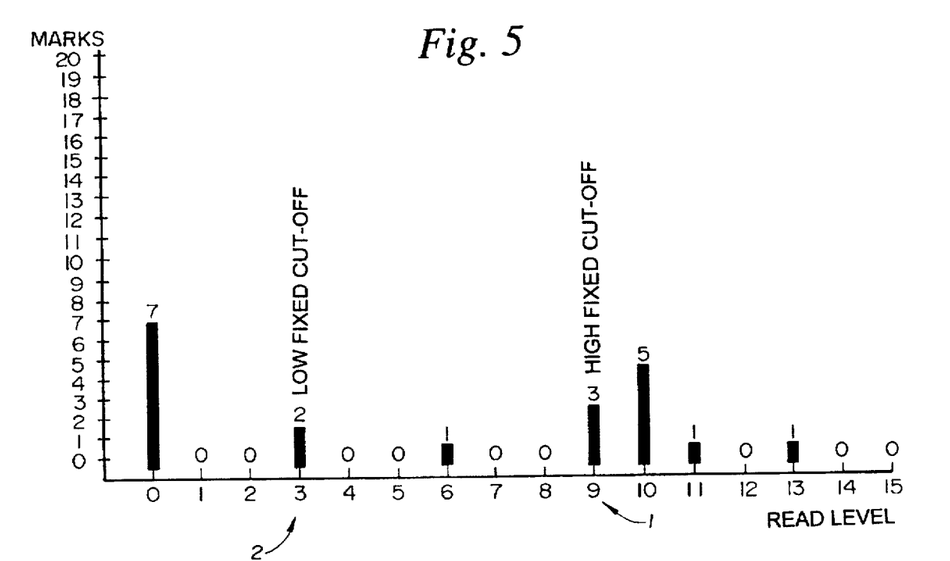

In the preferred embodiment, the search begins at the starting point read level and proceeds until the first gap (if any) of the primary gap length or (upon restarting) the first gap of secondary gap length is found. Regardless of the value of the primary gap length, the invention could be implemented to find all read level gaps of a particular length. In such a situation the system 50 must determine which of the gaps of the same length to select as the gap that determines the adjustable read level threshold. In the preferred embodiment of the present invention, as just described, the gap that spans the darkest read levels is used as the gap that determines the adjustable read level threshold. However, another read level gap of the same length may work as well. Consider FIG. 5, where the low fixed cut-off 2 is set at level 3 and the high fixed cut-off 1 is set at level 9. The primary gap length is set to two. There are two read level gaps of length two between the starting point read level and the low fixed cut-off. One spans read levels 4 and 5, and the other spans read levels 7 and 8. Using the threshold selection means 14 of the preferred embodiment, the latter gap will be used to determine the adjustable read level threshold, because the latter gap spans higher read levels than the former gap. The adjustable read level threshold in this situation will be set to level 9. However, the present invention may alternatively be implemented in a manner such that the threshold selection means 14 selects the gap that spans the lower levels to determine the adjustable read level threshold. If the gap that spans levels 4 and 5 were used, the read level cut-off would be set at level 6.

In another embodiment, the threshold selection means 14 does not specifically search for a gap of the primary gap length. Instead, a search is made simply for the longest gap, which is then used to determine the adjustable read level threshold in the same manner as if a gap of the primary gap length were found. If there is more than one gap that can be considered the longest (i.e., if there is a "tie" for the longest), then the implementation decision discussed above again arises with respect to the threshold selection means 14.

The scanning device described in the foregoing examples identifies 16 read levels, with level 15 representing the darkest read level. This specification and the claims should be read with the understanding that a "higher" read level means a darker mark, and not necessarily a mark that is identified by the scanner with a higher number. Similarly, a "lower" read level means simply a lighter mark. With this understanding, one can see that the present invention may operate with scanners that identify the darkest read levels with a low number and the lightest read levels with a high number. In the examples herein discussed, it is merely an arbitrary choice that a lighter read level corresponds to a lower number, and a darker read level corresponds to a higher number.

Data Processing Implementation

It is contemplated that the present invention will typically be implemented by software 16 running on a general purpose computer 11. See FIG. 7. Means for obtaining a read level value for the response bubbles is provided by a scanner 10 operating in connection with the computer or integrated into the computer hardware. The scanned read level values are stored by software 16.

One or more data structures would be used to manage the data associated with the system. This data will include the read levels for each of the response bubbles; noise level cut-off; high fixed cut-off (always-a-mark level); low fixed cut-off; default read level; primary gap length, and the status for each of the response bubbles after the adjustable read level threshold is established and applied (i.e., whether the response bubble was interpreted as "chosen" or "unchosen"). A simple two dimensional array can be used, for example, to store the read levels for the response bubbles. One dimension of the array would correspond to the number of questions on the examination or survey and the other dimension would correspond to the number of response bubbles per question. In other words, for an examination having fifty questions with five response bubbles per question, this implementation calls for a 50×5 array.

One skilled in the art will recognize that the size of the array can be much larger or much smaller than 50×5, depending on the implementation. For example, in the example given above, where there are fifty questions with five response bubbles for each question, a three dimensional array could alternatively be used, with the third dimension corresponding to the number of students taking the examination. If 10 students were taking the examination, the array would be 10×50×5. The three dimensional array permits all the read level information for each examinee's response bubbles to be stored in one data structure.

Alternatively, a much smaller data structure could also be used, because it is not essential that the read levels corresponding to all response bubbles in every question be simultaneously stored in the data structure. As previously described in the description of the preferred embodiment, the method for establishing an adjustable read level threshold involves analyzing the data in the read level distribution graph for only one question at a time. A different adjustable read level threshold is set for each question. That threshold depends only on the read level distribution graph for that particular question and is independent of the read level distribution graph for any other question. Therefore, once the read levels for each question are analyzed and the adjustable read level threshold is determined, the read levels for those response bubbles need not be maintained in the data structure. In other words, the read level information can then be discarded, and the array can then be used for the next question. In this implementation, the adjustable read level threshold for each question is determined, in real time, before the next question is scanned. The status of each response bubble is stored in a separate array or other data structure. The next answer area is then scanned, and the same procedure is repeated until all answer areas have been processed. This implementation permits an array as small as 1×5 to be used for storing response bubble read levels.

A data structure that is more complex than a simple one-, two-, or three-dimensional array would be appropriate for situations where there is a varying number of response bubbles per question, as is often the case in survey questionnaires, and as is occasionally the case in academic examinations. Many other types of data structures may be appropriate; the foregoing examples were presented for illustrative purposes only.

Use of Multiple Answer Results

The present invention provides an accurate system for determining whether each response bubble is intended to be chosen or intended to be left unchosen. The primary result, or the output, of the present system can be thought of as a chosen/unchosen status determination for each response bubble. Thus, for any given question in a test or survey, multiple intended answers to one question may be recognized. This multiple answer output can be used to implement a variety of examination (or survey) scoring scenarios not available in prior art systems that detect only a single response bubble mark. As compared to prior art systems that detect multiple answers using only a fixed threshold, the present invention encourages more creative scoring schemes, because it more reliably detects the multiple answers used in such schemes. For example, credit can be given on an academic examination for each correct answer chosen by the examinee where more than one correct answer is available for a single question, but less credit can be given where some but not all of the correct answers for that question are chosen. The present invention also enables negative credit schemes to be accurately implemented that penalize an examinee's incorrect responses. All of the examinee's chosen marks are reliably identified by the system of the present invention, so if an examinee chose an incorrect response bubble, it is possible to subtract points from the examinee's score. Also, response bubbles can be weighted so that choosing certain response bubbles (or failing to do so) can have a greater effect on the examinee's score than choosing or failing to choose other response bubbles.

For example, a scoring value approach involving both weighting and positive and negative credit could be as follows for a question with five response bubbles, "A" through "E":

| Response | A | B | C | D | E |
|---|---|---|---|---|---|
| Scoring Value | +1 | 0 | +2 | −1 | −2 |

A respondent choosing only answers A and C would get the maximum score of 1+2=3. If this respondent also marked answer E, the net score received would be 1+2−2=1. If the respondent chose only the answers C and D, then the net score received would be 2−1=1. A further variation on weighted scoring of this kind would be to limit the net score from going below zero.

Finally, the present invention permits a test administrator to deter guessing in a test (or in specific questions) for which the respondent is instructed to select no more than X correct answers out of a universe of Y possible answers. This is done by providing scoring means that penalizes the user if more than a specified maximum number of response bubbles is marked, for example by having the respondent's score for a question set to a penalty score of zero if more than X response bubbles are marked. There must also be means for storing the response bubble limit value, i.e., the maximum number of response bubbles allowed without penalty.

Although the present invention has been shown and described with respect to preferred embodiments, various changes and modifications that are obvious to a person skilled in the art to which the invention pertains are deemed to lie within the spirit and scope of the invention as defined by the following claims.

What is claimed is:

1. A system for interpreting response bubble marks on a scannable surface including a plurality of response bubbles associated with a single question for receiving a respondent's response bubble marks responsive to said question, said system comprising:

scanner means for determining and storing a read level for each of the plurality of response bubbles, each said read level being one of a plurality of values on a mark darkness scale;

means for identifying each response bubble mark having a darkness read level at or above a read level threshold as an intended response mark; and means for assigning a scoring value to each of said plurality of response bubbles, wherein at least two different response bubbles are assigned different non-zero scoring values.

2. A system as claimed in claim 1 wherein the different non-zero scoring values are both positive.

3. A system as claimed in claim 1 wherein the different non-zero scoring values include one positive and one negative value.

4. A method for interpreting response bubble marks on a scannable surface including a plurality of response bubbles associated with a single question for receiving a respondent's response bubble marks responsive to said question, said method comprising:

determining and storing a read level for each of the plurality of response bubbles, each said read level being one of a plurality of values on a mark darkness scale;

identifying each response bubble mark having a darkness read level at or above a read level threshold as an intended response mark; and assigning a scoring value to each of said plurality of response bubbles, wherein at least two different response bubbles are assigned different non-zero scoring values.

5. A method as claimed in claim 4 wherein the different non-zero scoring values are both positive.

6. A method as claimed in claim 4 wherein the different non-zero scoring values include one positive and one negative value.

7. The system of claim 1 wherein the stored read levels together define a read level profile, and the means for identifying an intended response mark further comprises:

threshold selection means for selecting an adjustable read level threshold, comprising:

means for identifying read level gaps in the read level profile; and threshold setting means responsive to read level gaps identified for setting the adjustable read level threshold.

8. The system of claim 7 wherein the threshold selection means further comprises means for defining a starting point read level and identifying the first read level gap of a specified gap length that encompasses read level values representing less mark darkness than the starting point read level.

9. The system of claim 8 wherein the means for defining a starting point read level comprises means for computing an average of all read level values greater than a pre-defined noise level for the response bubbles of a designated pool of response bubbles.

10. The system of claim 9 wherein said threshold selection means selects the read level gap that spans the darkest read levels on the mark darkness scale and is also at a read level below the starting point read level.

11. The system of claim 8 wherein the threshold selection means comprises means for defining a starting point read level and identifying the first read level gap of a specified gap length that encompasses read level values representing less mark darkness than the starting point read level, said threshold selection means setting the adjustable read level threshold at one read level darker than the darkest read level in the first read level gap.

12. The system of claim 8 wherein the system further comprises:

means for storing a low fixed cut-off value and a high fixed cut-off value, each being a read level value on the mark darkness scale;

and the threshold selection means is responsive to said means for storing and comprises:

means for limiting selection of the adjustable read level threshold to a value no higher than said high fixed cut-off; and means for limiting selection of the adjustable read level threshold to a value no lower than said low fixed cut-off.

13. The system of claim 8 wherein said specified gap length is a primary gap length of two, with a secondary gap length of one applied when no gap of the primary gap length is present.

14. The method of claim 4 wherein the stored read levels together define a read level profile, and the step of identifying an intended response mark further comprises:

identifying read level gaps in the read level profile; and in response to read level gaps identified, selecting an adjustable read level threshold and identifying each response bubble mark having a darkness read level at or above the adjustable read level as an intended response mark.

15. The method of claim 14 wherein the steps of identifying read level gaps and selecting an adjustable read level threshold comprise the steps of defining a starting point read level and identifying the first read level gap of a specified gap length that encompasses read level values representing less mark darkness than the starting point read level.

16. The method of claim 15 wherein the step of defining a starting point read level comprises computing an average of all read level values greater than a predefined noise level for the response bubbles of a designated pool of response bubbles.

17. The method of claim 16 wherein said step of selecting an adjustable read level threshold comprises selecting the read level gap that spans the darkest read levels on the mark darkness scale and is also at a read level below the starting point read level.

18. The method of claim 15 wherein the steps of identifying read level gaps and selecting an adjustable read level threshold comprise defining a starting point read level and identifying the first read level gap of a specified gap length that encompasses read level values representing less mark darkness than the starting point read level, then setting the adjustable read level threshold at one read level darker than the darkest read level in the first read level gap.

19. The method of claim 15 wherein the method further comprises:

storing a low fixed cut-off value and a high fixed cut-off value, each being a read level value on the mark darkness scale;

and the step of selecting an adjustable read level threshold is responsive to said stored values and comprises:

limiting selection of the adjustable read level threshold to a value no higher than said high fixed cut-off; and limiting selection of the adjustable read level threshold to a value no lower than said low fixed cut-off.

20. The method of claim 15 wherein said specified gap length is a primary gap length of two, with a secondary gap length of one applied when no gap of the primary gap length is present.

* * * * *